(12) United States Patent
Nicoletti

(10) Patent No.: US 7,014,384 B2
(45) Date of Patent: Mar. 21, 2006

(54) CONNECTION SYSTEM FOR FURNITURE STRUCTURAL ELEMENTS

(75) Inventor: Bruno Nicoletti, Calderino di Monte S. Pietro (IT)

(73) Assignee: Metal Work S.r.l., Bologna (IT)

( * ) Notice: Subject to any disclaimer, the term of this patent is extended or adjusted under 35 U.S.C. 154(b) by 12 days.

(21) Appl. No.: 10/452,302

(22) Filed: Jun. 2, 2003

(65) Prior Publication Data
US 2004/0018044 A1   Jan. 29, 2004

(30) Foreign Application Priority Data
Jun. 3, 2002   (IT) .......................... BO2002A0347

(51) Int. Cl.
*F16B 7/08*   (2006.01)
(52) U.S. Cl. .................. 403/234; 403/49; 403/235; 403/256; 403/289; 403/381; 403/192; 52/655.1; 52/656.9
(58) Field of Classification Search ............... 403/171, 403/176, 188, 192, 199, 205, 231, 233–235, 403/256, 289, 381, 49; 52/655.1, 656.9; 248/224.51; 312/205, 265.1–265.4; 108/155, 108/156, 159, 147.13, 147.15
See application file for complete search history.

(56) References Cited
U.S. PATENT DOCUMENTS 4,445,307 A * 5/1984 Puccinelli et al. ............ 52/638
5,028,164 A * 7/1991 Williams .................... 403/246
5,035,186 A   7/1991 Uredat et al.
6,481,912 B1 * 11/2002 Shih .............................. 403/49
6,575,652 B1 * 6/2003 Krauss ......................... 403/49
6,584,918 B1 * 7/2003 Lee ............................. 108/155
6,808,334 B1  10/2004 Nicoletti

FOREIGN PATENT DOCUMENTS

DE        94 16 016 U       1/1995
IT        BO2001A000528     3/2003

* cited by examiner

*Primary Examiner*—Daniel P. Stodola
*Assistant Examiner*—Michael P. Ferguson
(74) *Attorney, Agent, or Firm*—William J. Sapone; Coleman Sudol Sapone PC

(57) ABSTRACT

The connection system is for connecting structural elements of pieces of furniture, which structural elements include a plurality of support posts and a plurality of bars which are fastened to corresponding posts in accordance with predetermined geometrical configurations, to build a support structure for the above mentioned pieces of furniture. The connection system includes, for each post, a tube fastened to an end of the post, a plurality of connection annular elements for each connection between the bars and the posts, each one of the annular elements delimiting a hollow space provided for the coaxial coupling with a corresponding tube; and fasteners for fastening each bar to at least one connection annular element. The fasteners, in particular, include a side protrusion, for instance shaped like a dovetail, and a couple of mobile fastening clamps situated at the ends of the bar and designed for clamping the side protrusion for making a stable connection between the bar and the post.

10 Claims, 8 Drawing Sheets

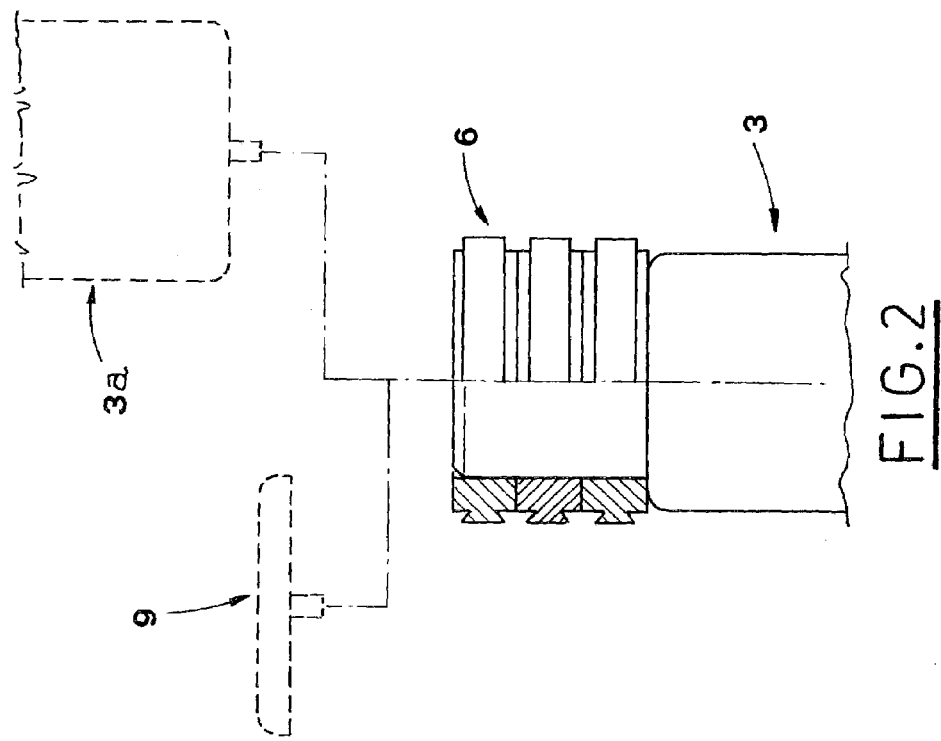
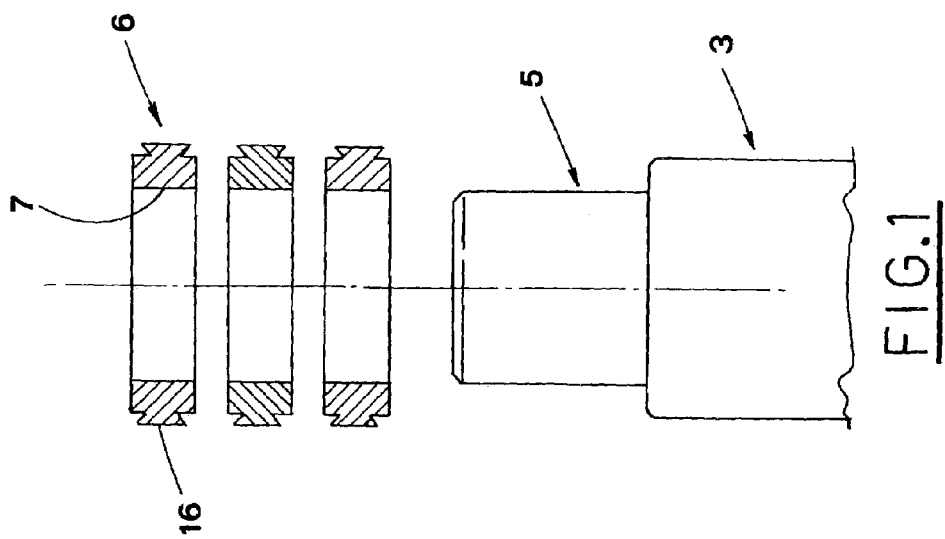

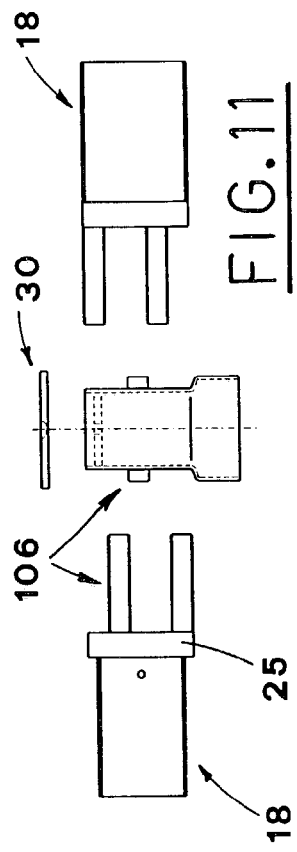
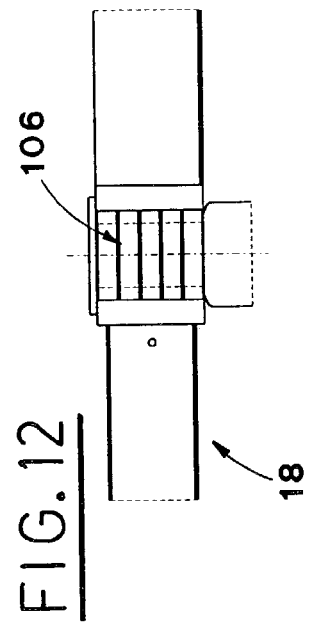

CONNECTION SYSTEM FOR FURNITURE STRUCTURAL ELEMENTS

FIELD OF THE INVENTION

The present invention relates to the production of furniture, and more particularly furniture for offices.

In particular, the invention relates to a new system for connecting elements of a modular structure, which is designed to form the support frame of the modular structure, and to support shelves and other constructive elements.

BACKGROUND OF THE INVENTION

A need, which is very felt in the field of furniture production and in particular in the field of production of furniture for offices, is that of providing modular pieces, which are composed of elements easy to connect to each other and providing as high versatility as possible in disposing the various pieces.

Furnishing a room used as an office may, in fact, require various components such as work desks, shelves, movable walls, in accordance with complicated and articulated configurations.

Moreover, among the different criteria for designing such pieces of furniture, the ergonomic characteristics and the optimisation of the functional characteristics becomes more and more important. This fact often implies designing series of pieces of furniture including components with irregular, non linear shape.

Consequently, the support frames of the components must include horizontal elements, or bars, which are not connected to one another according to squared angles, but rather according to diverse angles, in the horizontal plane, and anyway parallel to the extension of the shelves or work desks.

The bars are connected to one another and to vertical posts by means of connection members, which can be separated from, or made integral with, the above mentioned bars or posts.

All this, among other things, implies the necessity to provide a connection system capable of connecting one or more bars of the frame to the respective post, in accordance with all the possible angles as required by the designed configuration.

On the other hand, it would be anyway extremely important that this connection system included a very limited number of parts, so as to keep production, storage management and montage operation simple and inexpensive.

The conventional connection systems usually include connection points between the bars and the respective post with one or more fixed orientations and are produced according to different constructive techniques.

An example of such connection systems is described in the Italian patent application No. BO2001A 00528. According to the system described therein, the shape of the post is substantially squared. Each corner has a recess extending along the entire post. In each side of the post there is made a side dovetail groove, also extending along the entire post.

A bar can be secured to each one of the corners, as well as to each one of the side grooves, by means of suitable fastening blocks provided at the ends of the bar. The fastening blocks for securing the bar to the corners are different from the ones for fastening the bars to the side grooves.

Although the above mentioned connection system is quite easy to use and allows different heights for each one of the bars being secured to the post, the bars can be secured to the post only according to a pre-determined limited number of angles.

SUMMARY OF THE INVENTION

The main object of the present invention is to propose a connection system for structural elements of furniture, which permits the bars to be secured to the corresponding posts according to any desired angle.

A further object of the invention is to propose a connection system, which includes a very limited number of parts.

It is another object of the invention to provide a connection system, with which the connection between different bars and a unique post can be obtained in independent way for each bar and can be easily changed even after the connection has been completed.

It is still a further object of the invention to provide a connection system with which different bars can be connected to the same post with different heights, either in a single group or separately.

Yet another object of the invention is to provide a connection system with which the connection can be obtained in a simple, reliable and strong way.

The above mentioned objects are achieved, in accordance with the contents of the claims, by means of a connection system for connecting furniture structural elements, the structural elements including:

a plurality of support posts;

a plurality of bars designed to be connected to corresponding posts in accordance to predetermined geometric configurations to form a support frame for the above mentioned furniture;

the said connection system including:

a tube secured at top of each support post;

at least one connection annular element for each connection between said bars and posts, said annular element delimiting a hollow space provided for the coaxial coupling of said annular element with a corresponding said tube;

fastening means for fastening each one of the above mentioned bars to at least one corresponding connection annular element.

BRIEF DESCRIPTION OF THE DRAWINGS

The characteristics of the invention, as they will be evident from the claims, will be best understood from the detailed description below, read in conjunction with the accompanying drawings, in which:

FIG. 1 shows a lateral schematic, partially sectional, view of a support post and some annular elements formed in accordance with the invention;

FIG. 2 shows the annular elements of FIG. 1 when they are mounted on the post;

FIG. 10 shows a perspective view of a second embodiment of the invention, at a stage preceding the assembling operation;

FIG. 11 shows a lateral view of the connection points of FIG. 10;

FIGS. 12 and 13 show a lateral and plan view, respectively, of the connection point of FIG. 10 after that the horizontal bars have been mounted onto the post;

DESCRIPTION OF THE PREFERRED EMBODIMENTS

Figure 3:
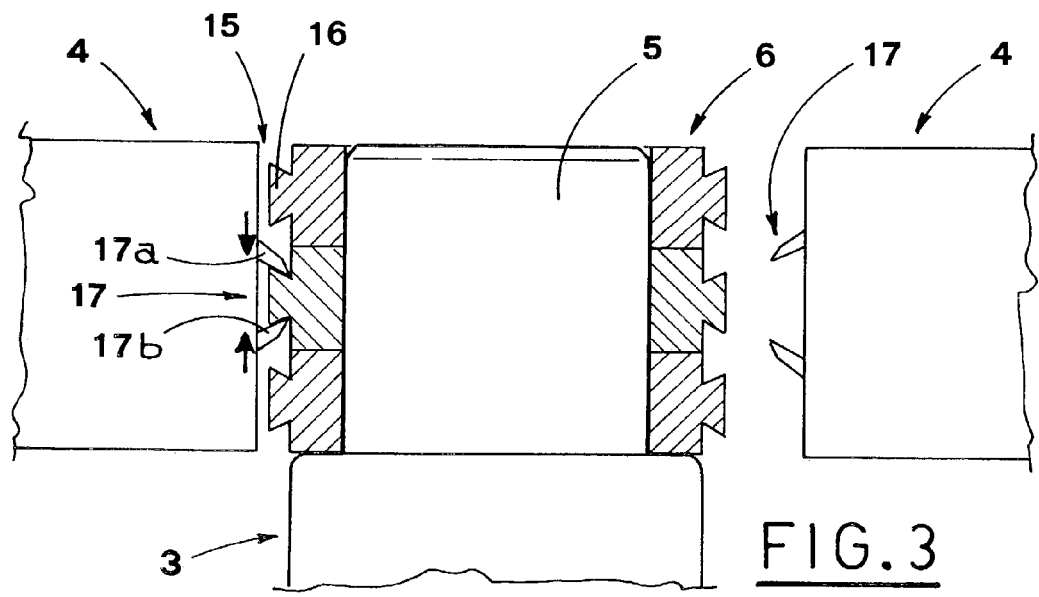
FIG. 3 shows a lateral schematic view of a support post when it is connected with a couple of horizontal bars by means of the system proposed by the invention.
Figure 4:
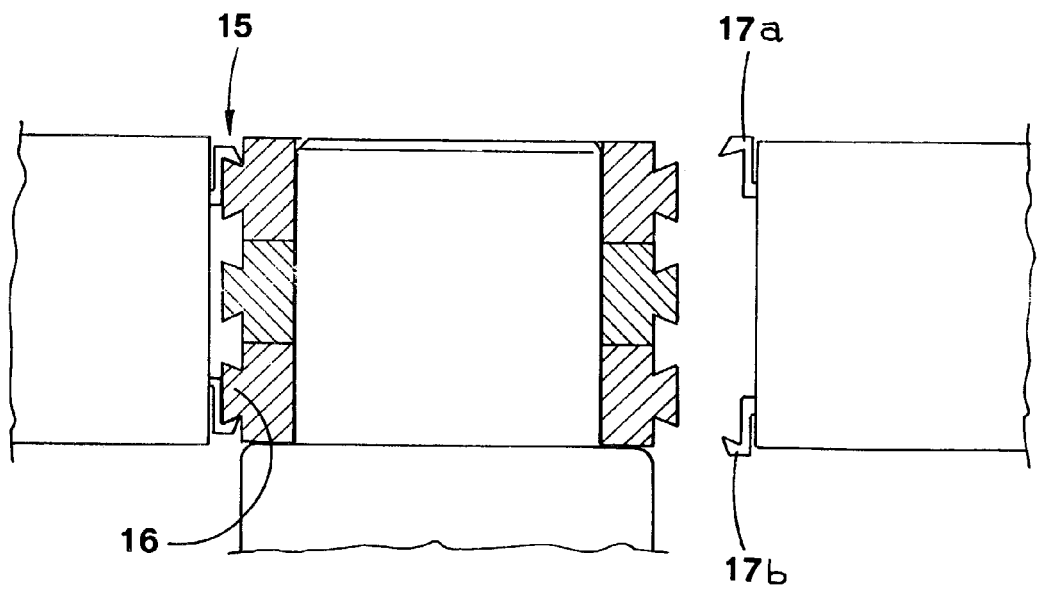
FIG. 4 shows a way of making the connection different from the one of the previous Figure.
Figure 5:
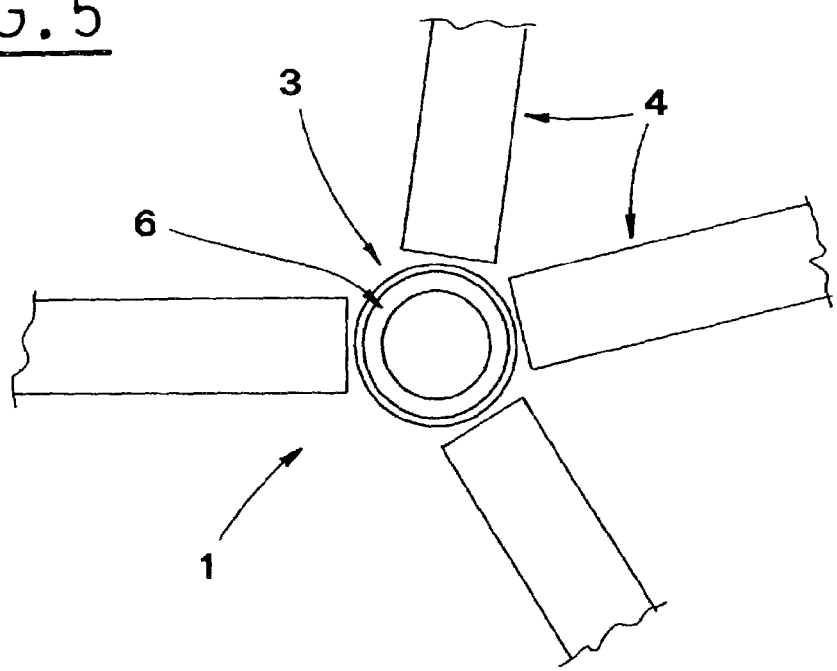
FIG. 5 schematically shows a connection of a support post with a plurality of horizontal bars, which can be obtained by the system proposed by the invention.

With reference to the above mentioned figures, reference numeral 10 indicates the support frame of a series of pieces of furniture, which incorporate the present invention. This support frame includes various structural elements, the most important ones of which include support posts 3, which are to be mounted in a substantially vertical position, and support bars 4, which are connected to the posts 3 and designed to take a substantially horizontal position, in accordance with pre-determined connection configurations. Such connection configurations depend on the design of each piece of furniture being produced. The posts 3 and the bars 4 are connected to one another by means of the connection system made in accordance with the present invention.

According to a first embodiment (see FIGS. 1 to 4), the system includes a tube 5 for each post 3. The tube 5 is situated at the end of the post 3 and is, preferably, made integral therewith. The tube is substantially cylindrical and is hollow.

The connection system also includes a plurality of connecting annular elements 6, each one delimiting a hollow space 7. The annular elements 6 are to be fitted slidingly and rotatably onto one tube 5, which is introduced into the hollow space 7. Each tube 5 can support a plurality of such annular elements 6. The first one of the annular elements goes in abutment onto the shoulder formed by the upper end of the post 3, which is larger in diameter than the tube 5. The other annular elements 6 mounted thereafter rest onto the lower most one.

Fastening means 15 are provided on each horizontal bar 4 to fasten the latter to a corresponding annular element 6. These fastening means 15 include a side protrusion 16 made on the annular element 6 and protruding sidewise from the perimetral surface of annular element and extends along the entire perimeter. The side protrusion has a dovetail shape.

The fastening means include also a pair of fastening clamps 17a, 17b, situated at the end of each horizontal bar 4. The fastening clamps 17a, 17b can be moved crosswise to the annular element 6, and therefore also to the side protrusion 16, so that they can get closer to, or farther from, each other.

The can engage the side protrusion 16 to clamp it and fasten thereby the horizontal bar 4 to the annular element 6 and, when the annular element is mounted to its operation position, also to the post 3. The shape of the part of the fastening clamps 17a, 17b going in contact with the side protrusion 16 matches the shape of the corresponding part of the same protrusion, so as to ensure a firm connection.

The fastening clamps 17a, 17b are operated, according to well known techniques, by means of a mechanism preferably via a screw-rack meshing arrangement, which can be driven from outside the horizontal bar 4.

FIG. 3 shows the fastening system, in which the fastening clamps 17a, 17b engage the side protrusion 16 of a single annular element 6. It is anyway possible, in certain cases, that each one of the clamps engages a side protrusion 16 owing to different, even not adjacent, annular elements 6 (see FIG. 4).

It will be understood that the connection contact between the clamps 17a, 17b and the relevant side protrusion 16 may take place in any angular position of the protrusion. Consequently, the horizontal bar 4 can be oriented according to any possible angle. The same annular element 6, as well as other annual elements 6, fitted onto the same tube 5, may support other horizontal bars 4, which are also oriented according to any desired angle, with reference to the first one.

According to a variation of the embodiment just referred to, the fastening clamps 17a, 17b are secured to an end of a box-like hollow support, which has a recess 18a at the opposite end, to receive slidingly the end of a corresponding horizontal bar 4. This permits more versatile assembling operation.

According to a second embodiment of the invention, shown in FIGS. 10 to 13, the annular elements 106 are secured either to one end of the horizontal bars 4, or to an end of a box-like element, which has a recess 18a at the opposite end, to receive a horizontal bar 4, like in the previously described embodiment.

In this case, fastening means 115 are provided which include a "U"-shaped plate 25 secured to the end of the horizontal bar 4 (or of the box-like element 18). An extension 26, made on one side of the annular elements 106, and extending along a portion of the perimeter thereof, is secured, preferably by welding, to the plate 25.

A couple of such annular elements 106 can be secured to each plate 25, in coaxial relation with each other, at different pre-determined heights. In case the annular elements 106 belong to different horizontal bars 4, which are however to be mounted onto the same tube 5, the annular elements are secured to the respective plates at pre-determined height always different, so that, once they have been mounted onto the tube 5, the annular elements 106 result situated one over another. In this way, a more stable and strong connection is ensured (see in particular FIGS. 11 and 12).

Figure 14:
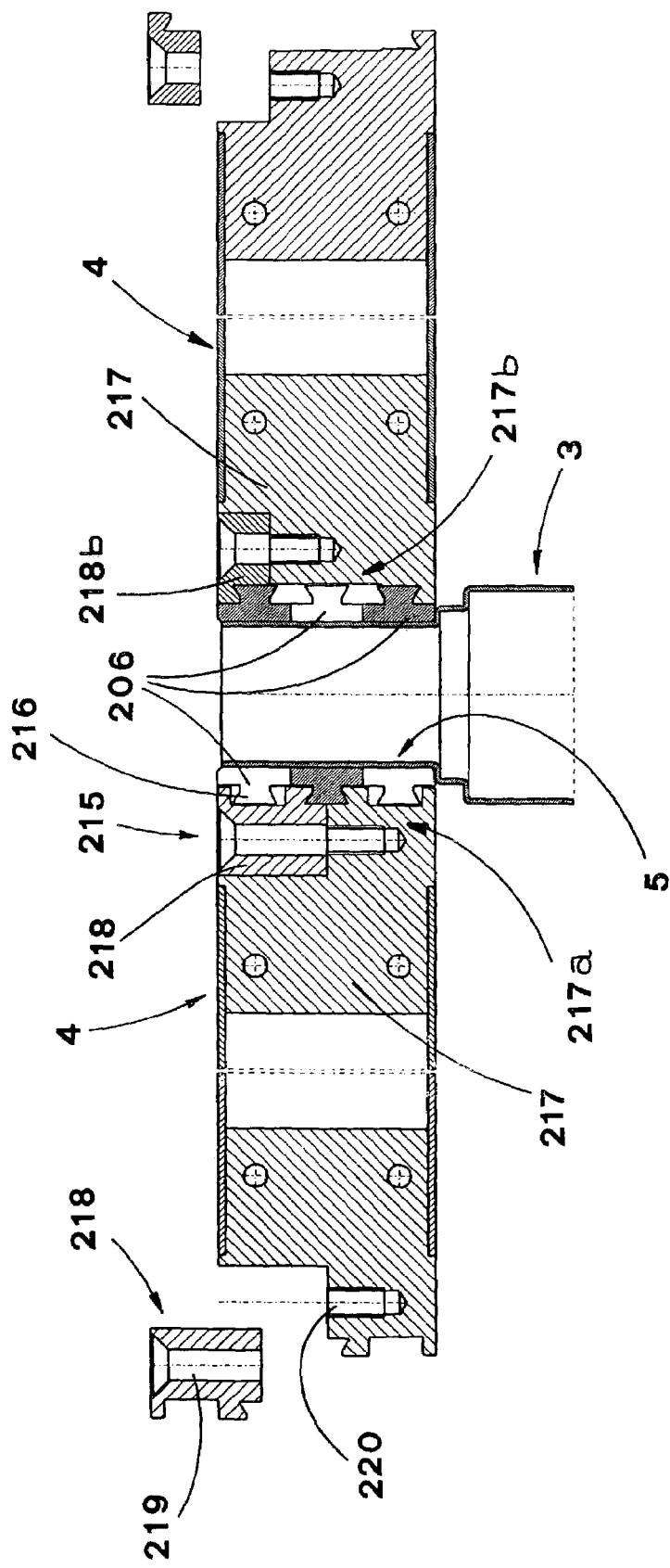
FIG. 14 show a longitudinal sectional view of a connection obtained according to a third embodiment of the system of the invention.

According to a third embodiment of the invention, shown in FIG. 14, fastening means 215 are provided, which include a block 217 with a cross-section capable of fitting into the end of a respective horizontal bar 4. Moreover, each annular element 206, which is shaped as already described for the first embodiment of the invention, has a dove-tail side protrusion 206.

The block 217, when mounted in its operation position, protrudes from the above mentioned horizontal bar 4. The free end of the block 217 has a protruding terminal portion 217a, which is to be coupled with a locking member 218 by means of a screw passing through a hole 219, made in the locking member 218, and engaging with a threaded hole 220 made in the terminal portion 217a.

The front ends of both the terminal portion 217a and the locking member 218 are shaped in such a way that they can, together, the side protrusion 216 of one or more annular elements 216, which are mounted onto the tube 5. In particular, their shape is such that coupling between the parts is possible when the locking member 218 is not fixed to the terminal portion 217a, and that such coupling is locked when the locking member 218 is fastened to the terminal part by tightening the above mentioned screw.

FIG. 14 shows two different way for obtaining the connection in accordance with the third embodiment of the invention described hereinabove. The left section of the drawing shows a terminal portion 217a and a locking member 218 shaped in a way such as to engage only one annular element 206, in particular the one situated in the middle position. The right section of the drawing shows a terminal section 217b and a locking member 218b, which are shaped in a way such as to engage two different annular elements 206, in particular the lowermost one and the uppermost one situated on the tube 5.

Figure 15:
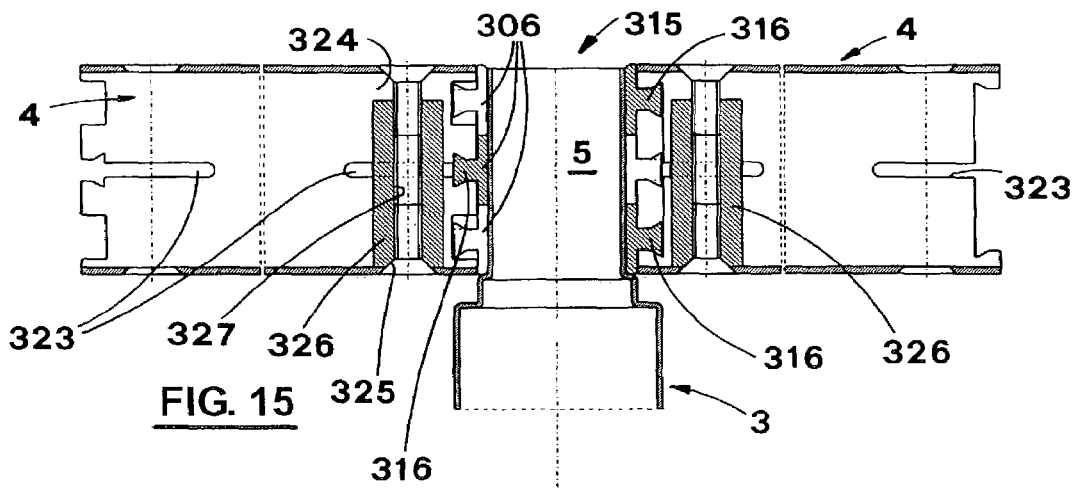
FIG. 15 show a longitudinal sectional view of a connection obtained according to a fourth embodiment of the above mentioned system.
Figure 16:
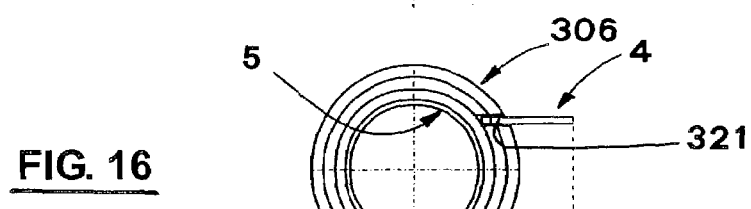
FIG. 16 schematically shows a plan view of a portion of the connection of FIG. 15.

FIGS. 15 and 16 show a fourth embodiment of the invention. There are provided fastening means 315, which include, for each annular element 306 as described above, a side protrusion 316, which is also in this case shaped as a dovetail. The end of each horizontal bar 4 is shaped in complementary way with respect to the above mentioned side protrusion 316 and in a way such as not to engage with other side protrusions of other annular elements 306 mounted on the tube 5.

The above mentioned Figures show two ways of connecting, in one of which (left section of FIG. 15) the end of the horizontal bar 4 engages the annular element 306 situated in the middle position. According to the other way (right section of the same Figure) the end of the horizontal bar 4 engages the side protrusions belonging to the annular elements 306 situated at the opposite ends of the tube 5.

To allow engagement of the side protrusion 316 with the end of the horizontal bar 4, which has a complementary shape, notches 321,322 are made in the same protrusions 316 with a suitable distance between them.

Longitudinal cuts 323 are made at the terminal portions of the horizontal bar 4, at the central position of opposite sides, so that the terminal portions have some flexibility. Through holes 324,325, aligned with each other, are made in the other opposite sides of the horizontal bar 4.

A cylindrical element 326, shorter than the distance between such holes 324,325, is bored longitudinally and internally threaded. The cylindrical element 326 is mounted inside the horizontal bar 4. The through hole 327 of the cylindrical element 326 is set in alignment with the above mentioned holes 324,325. A pair of screws 328,329 fix the cylindrical element 326 to the horizontal bar 4 and, when tightened, secure the end of the horizontal bar to the side protrusion 316 (or to the protrusions 316 of different annular elements, as in the connection illustrated in the right section of FIG. 15).

It will be obviously understood that the ends of the horizontal bar 4, shaped as just described, may instead be formed, also in this case, by additional members, which are fitted or in other way fastened to the ends of the same horizontal bar. This last mentioned variation is very simple and therefore it is not illustrated.

Figure 17:
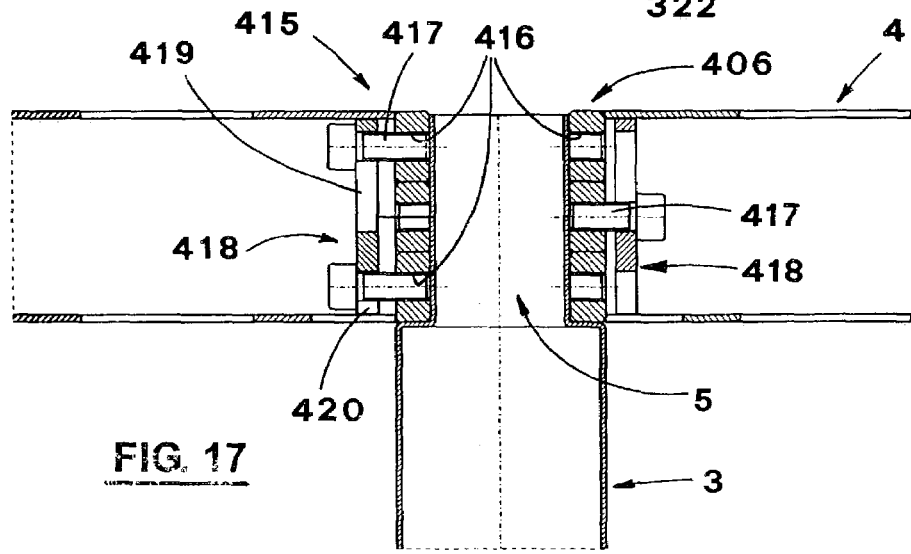
FIG. 17 shows a longitudinal sectional view of a connection obtained according to a fifth embodiment of the above mentioned system.
Figure 18:
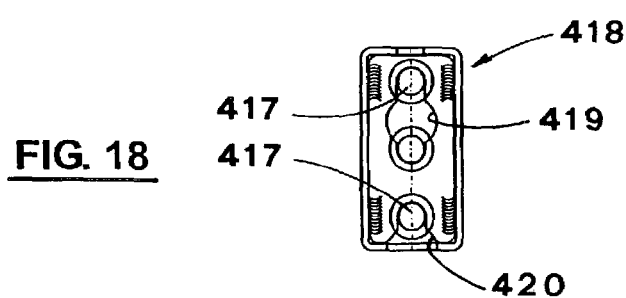
FIG. 18 shows a lateral view of the locking device of FIG. 17.

According to a fifth embodiment of the invention, shown in the FIGS. 17 and 18, there are provided fastening means 415, which include a plurality of radial threaded holes 416, made in each annular element 406 mounted on the tube 5.

Corresponding bolts 417 are screwed into said holes 416, so that their heads protrudes from the relevant annular element 406.

Also, a slotted plate 418, having slots 419,420 made therein, is secured close to each end of the horizontal bar 4, crosswise thereto. The slots 419,420 have a section wider than the head of the bolts 417 and a section narrower than the head of the bolts 417 but slightly wider than the stem of the same bolts. In this way, the bolts can engage the respective slots 419,420 by introducing the heads, up to the stem, into the wider sections of the slots and then moving the horizontal bar 4, along with the slotted plate 418, up to the point in which the stems of the bolts 417 fits into the narrower section of the slots.

The left section of FIG. 17 shows a connection obtained by fitting the bolts 417 in two annular elements 406, while the right section of this Figure shows a connection obtained by using one or more bolts 417 screwed into holes made in only one annular element 406.

Also in this last described fifth embodiment, the connection between a horizontal bar 4 ad a respective post 3 can be obtained according to any angle, because the annular elements 406 are anyway free at sliding around the corresponding tube 5.

In any case, the annular elements 406, once the correct connection angle has been established, can be secured to the related tube 5 in very simple way, for instance by means of a screw dowel, which is screwed into a threaded hole made in each one of the annular elements 406.

The connection system according to the present invention also includes a plurality of top plates 30, provided with holes situated at predetermined positions. These top plates 30 are aimed at being fixed at the top of each tube 5, for instance by screwing into a threaded element, which is not shown, situated inside the tube 5. The top plates 30 also are designed for supporting the work planes 8 of the pieces of furniture.

The horizontal bars 4 may also be extensible, for instance produced with a telescopic structure, so as to increase the number of possible obtainable configurations for the support frame.

Figure 6:
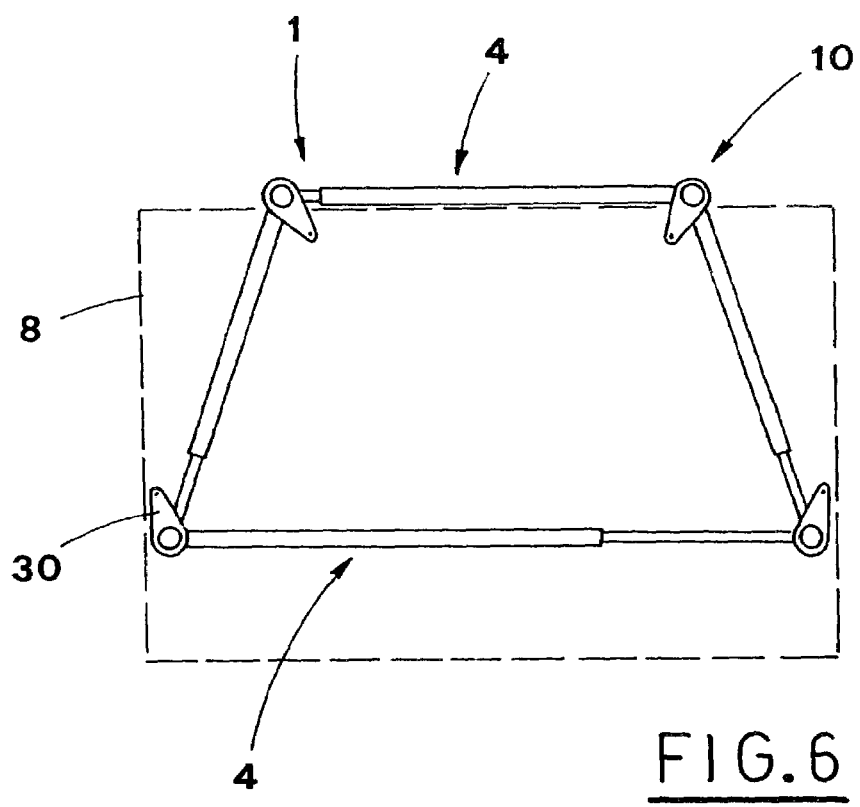
FIGS. 6, 7 and 8 shows different plan, partially sketched, of pieces of furniture made using the invention.
Figure 7:
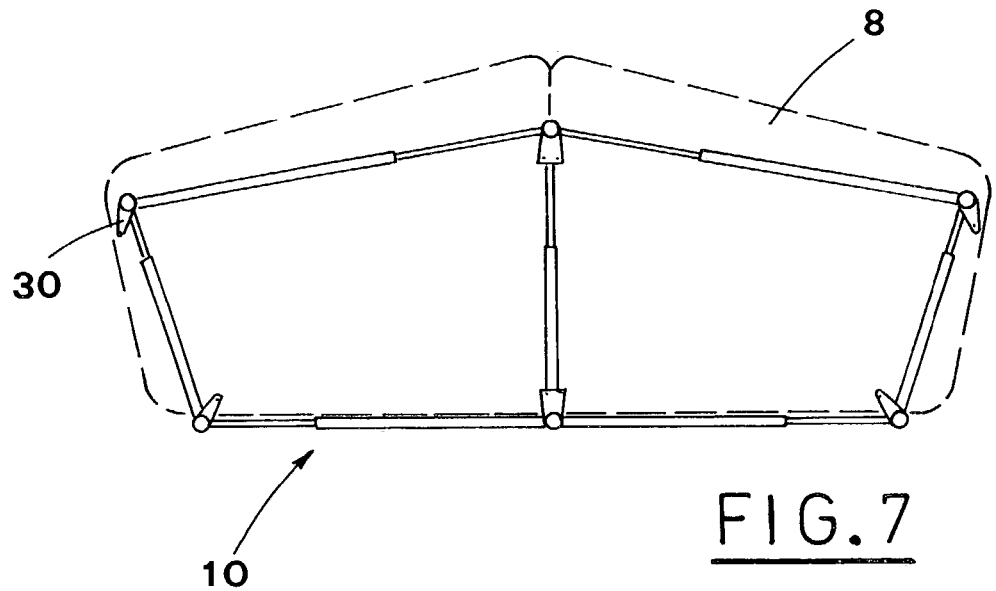
Figure 8:
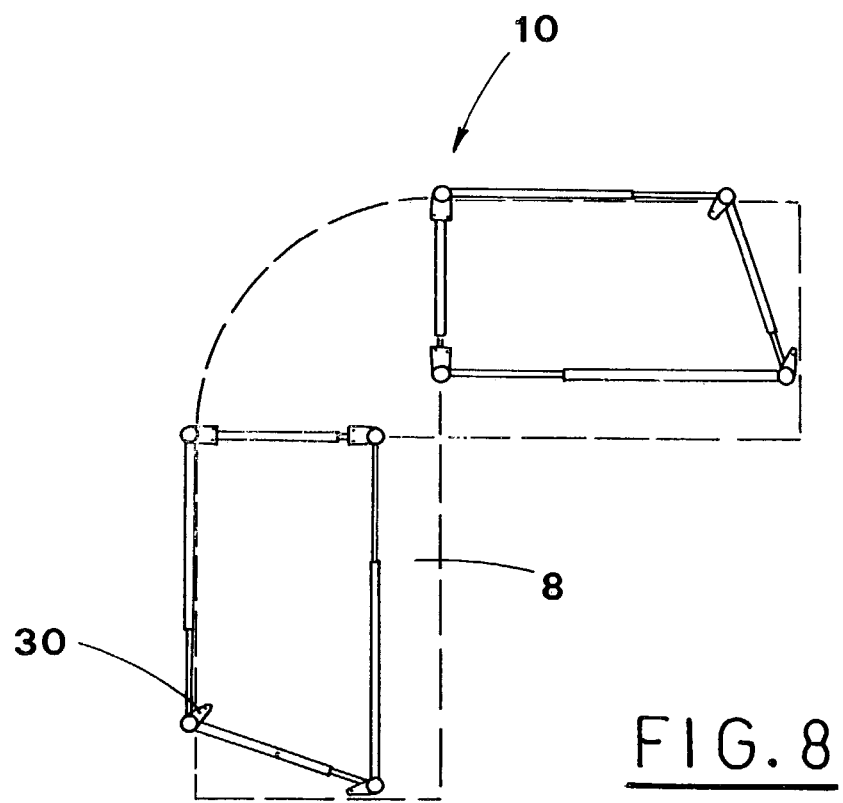
Figure 9:
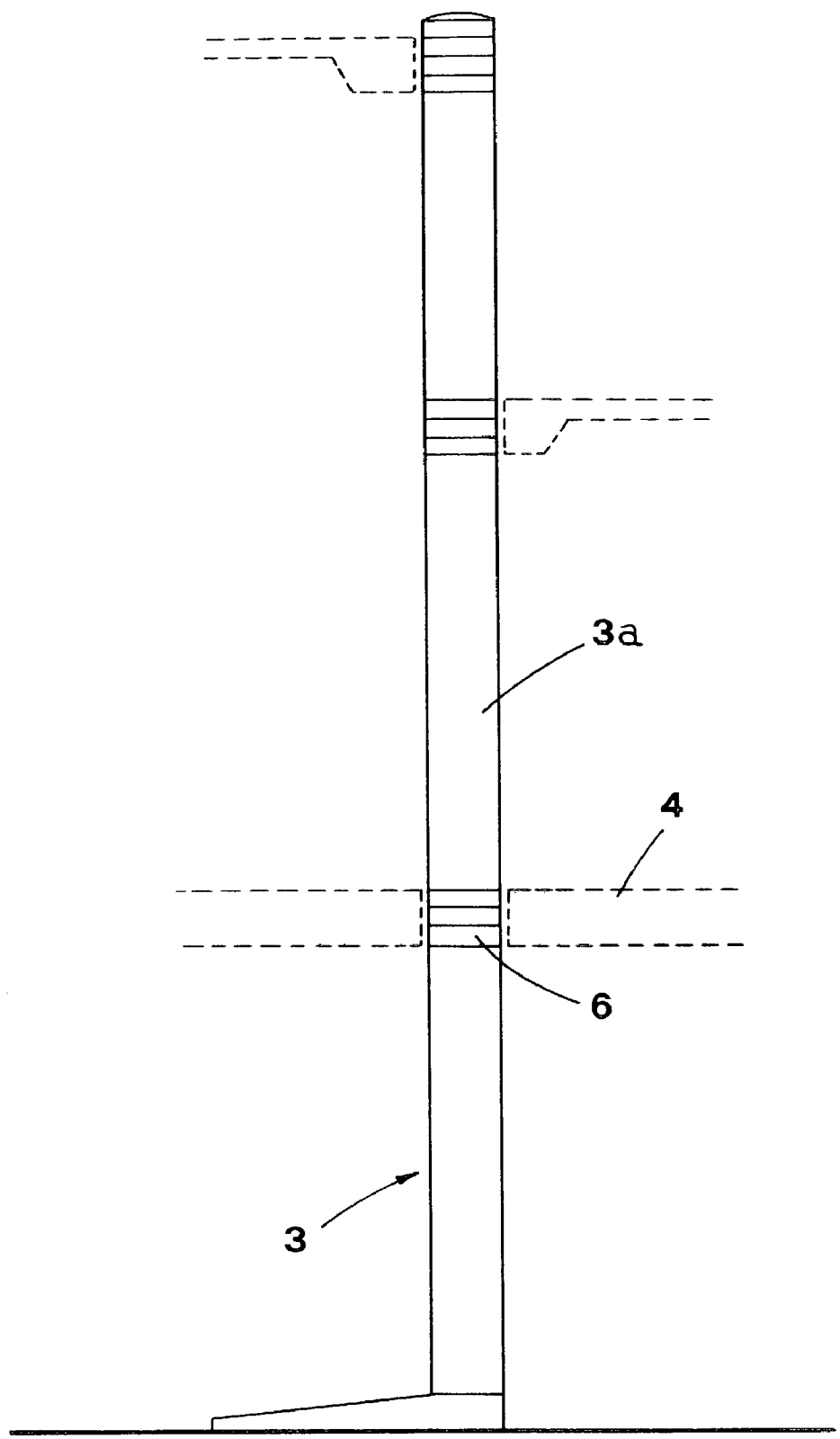
FIG. 9 schematically shows an multi-level piece of furniture made according to the invention.

FIGS. 6, 7 and 8 show some possible configurations of such structure, which can be obtained by means of the connecting system of the invention, in accordance with diverse shapes of the working surfaces. It will be noted that, for instance, part of the posts can be mounted outside of, i.e. beside, the working surfaces, so as to allow multi-level posts to be mounted (see FIG. 8). This configuration can be, for instance, obtained by fitting the bottom of an upper post 3a into the tube 5 of a post 3 mounted outside (see FIG. 2). As an alternative, for the purpose of finishing, a closing cap 9 can be mounted on top of the tube 5.

The advantages obtained by means of the present connection system are well evident and basically include the possibility of mounting the horizontal bars according to the angle corresponding to the shapes of the working surfaces, without any limitation due to the securing mechanism mounted between the horizontal bars and the related post.

The structure thus obtained is also strong, stable and easy to modify, so that it can support different working surfaces or it can be easily disassembled and then assembled later on.

It will also understood from what above described, that the horizontal bars can be connected to a single post even at different heights, if this is necessary for the support frame of the piece of furniture being mounted.

What is claimed is:

1. A connection system for connecting furniture structural elements comprising:

a plurality of vertical support posts;

a plurality of bars connectable to the support posts to form a support frame for the furniture structural elements;

a tube secured to a top of each support post, the tube having a diameter smaller than the top of the support post;

at least one annular connection element, for each connection between said bars and said posts each annular element having an upper flat surface, a lower flat surface and an outer perimetral side surface, an annular side protrusion protruding sidewise from the side surface and extending for at least a portion of a perimeter of the annular element, the annular element having a hollow space having a diameter corresponding to the diameter of the tube for sliding and rotating thereover, coaxially mounting said annular element over said tube, said annular element resting upon the top of the post;

fastening means for fastening each bar to at least one annular connection element, said fastening means including a pair of mobile fastening clamps situated at each end of the bar for coupling to at least one annular side protrusion of at least one annular connection element mounted on said tube.

2. The connection system according to claim 1, further comprising a box-like support slidingly received on one end of one bar, said fastening clamps mounted on an end of the box-like support.

3. The connection system according to claim 1, wherein said side protrusion is dovetail shaped.

4. The connection system according to claim 1, wherein said fastening clamps have an external shape complementary to a shape of said side protrusions.

5. The connection system according to claims 4, further comprising a box-like support slidingly received on one end of one bar, said fastening clamps mounted on an end of the box-like support.

6. The connection system according to claim 1, wherein said tube receives a plurality of said annular elements placed thereover in a stack, and one of each pair of the mobile fastening clamps engaging a side protrusion of a different annular element in the stack.

7. The connection system according to claim 6, further comprising a box-like support slidingly received on one end of one bar, said fastening clamps mounted on an end of the box-like support.

8. The connection system according to claim 1, wherein said bars are extensible.

9. The connection system according to claim 8, wherein said bars are telescopic.

10. The connection system according to claim 1, further comprising a plurality of top plates, each plate fixed to a free end of one of said tubes for supporting working surfaces or other plane elements of the furniture structural elements.

* * * * *